(12) United States Patent
Chang et al.

(10) Patent No.: US 11,369,014 B2
(45) Date of Patent: Jun. 21, 2022

(54) LIGHT BEAM GENERATING DEVICE, PROJECTION DEVICE, AND LIGHT BEAM GENERATING METHOD

(71) Applicant: Coretronic Corporation, Hsin-Chu (TW)

(72) Inventors: Wen-Hsin Chang, Hsin-Chu (TW); Chung-Lin Ke, Hsin-Chu (TW); Shun-Tai Chen, Hsin-Chu (TW); Tung-Yi Lu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/167,050

(22) Filed: Feb. 3, 2021

(65) Prior Publication Data

US 2022/0022297 A1 Jan. 20, 2022

(30) Foreign Application Priority Data

Jul. 14, 2020 (CN) .......................... 202010674679.8

(51) Int. Cl.
*H05B 47/10* (2020.01)
*H05B 45/20* (2020.01)
*G03B 21/20* (2006.01)

(52) U.S. Cl.
CPC ........... *H05B 47/10* (2020.01); *G03B 21/206* (2013.01); *H05B 45/20* (2020.01)

(58) Field of Classification Search
CPC ....... H05B 47/10; H05B 45/20; G03B 21/206
See application file for complete search history.

(56) References Cited

U.S. PATENT DOCUMENTS

| | | | |
|---|---|---|---|
| 2019/0302599 A1* | 10/2019 | Ke | ........................ H04N 9/3155 |
| 2020/0166827 A1* | 5/2020 | Chen | .................... G03B 21/321 |
| 2020/0192204 A1* | 6/2020 | Tarpan | ................. G03B 21/206 |

FOREIGN PATENT DOCUMENTS

| | | |
|---|---|---|
| CN | 102141210 | 8/2011 |
| CN | 108267918 | 7/2018 |
| CN | 110401996 | 11/2019 |

* cited by examiner

*Primary Examiner* — Minh D A
(74) *Attorney, Agent, or Firm* — JCIPRNET

(57) ABSTRACT

The invention relates to a light beam generating device and method, and a projection device. The light beam generating device is configured to receive a color control signal and generate a target light beam having a target color, and includes a plurality of drivers, a current signal generating circuit, and a control circuit. The drivers respectively drive a plurality of light-emitting elements according to a plurality of current signals, wherein the plurality of light-emitting elements collectively generate the target light beam. The current signal generating circuit is coupled to the drivers and generates the plurality of current signals according to the color control signal corresponding to the target color. The control circuit is coupled to the drivers and controls whether each driver is enabled according to the color control signal.

16 Claims, 8 Drawing Sheets

LIGHT BEAM GENERATING DEVICE, PROJECTION DEVICE, AND LIGHT BEAM GENERATING METHOD

CROSS-REFERENCE TO RELATED APPLICATION

This application claims the priority benefit of China application serial no. 202010674679.8, filed on Jul. 14, 2020. The entirety of the above-mentioned patent application is hereby incorporated by reference herein and made a part of this specification.

BACKGROUND OF THE INVENTION

Field of the Invention

The invention relates to a light beam generating device of a projector, and in particular to a light beam generating device adopting a plurality of light sources.

Description of Related Art

In terms of the light source architecture of a projector, a blue laser diode (LD) is usually used as the laser light source. Blue laser is irradiated onto a phosphor wheel to excite the phosphor of each color to respectively generate different colors of light, such as green light and yellow light. Red light is obtained by filtering yellow light via a filter wheel.

However, the conversion efficiency of using laser to excite phosphors to generate fluorescence is lower, resulting in a higher proportion of laser energy being wasted, and a large amount of heat energy that is difficult to dissipate is also generated in the process. Under the development trend of larger projection sizes, the requirements for projection brightness are higher. Therefore, under the condition of continuously increasing laser excitation power, the issue of low fluorescence conversion efficiency is more prominent. Therefore, it is necessary to propose an effective solution to the issue of low fluorescence conversion rate.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a light beam generating device that may solve the issue of low fluorescence conversion rate.

The light beam generating device of the invention is configured to receive a color control signal and generate a target light beam having a target color. The light beam generating device includes a plurality of drivers, a current signal generating circuit, and a control circuit. The plurality of drivers are configured to respectively drive a plurality of light-emitting elements according to a plurality of current signals, wherein the plurality of light-emitting elements collectively generate the target light beam. The current signal generating circuit is coupled to the plurality of drivers and configured to generate the plurality of current signals according to the color control signal corresponding to the target color. The control circuit is coupled to the plurality of drivers and configured to control whether each of the drivers is enabled according to the color control signal.

The invention provides a projection device including the light beam generating device.

The light beam generating method of the invention is configured for a light beam generating device and configured receive a color control signal and generate a target light beam having a target color, including: generating a plurality of current signals via a current signal generating circuit of the light beam generating device according to the color control signal corresponding to the target color; driving a plurality of light-emitting elements respectively via a plurality of drivers of the light beam generating device according to the plurality of current signals, wherein the plurality of light-emitting elements collectively generate the target light beam; and controlling whether each of the drivers is enabled via a control circuit of the light beam generating device according to the color control signal.

Based on the above, the light beam generating device of the invention directly adopts a plurality of light sources. Therefore, the light beam generating device of the invention may eliminate the phosphor wheel or the filter wheel, thus fundamentally solving the issue of low fluorescence conversion efficiency. Furthermore, the light beam generating device of the invention may also determine the amount of the drive current of the light-emitting elements and whether each of the drivers is enabled according to the color control signal. Thereby, the light beam generating device may generate the target light beam by using a single light source or mixing a plurality of light sources, so that the placement of a color gamut may be better adjusted.

In order to make the above features and advantages of the invention better understood, embodiments are specifically provided below with reference to figures for detailed description as follows.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The foregoing and other technical content, features, and effects of the invention will be clearly presented in the following detailed description of a preferred embodiment with reference to the accompanying figures. In addition, the terminology mentioned in the embodiments, such as: up, down, left, right, front, rear, etc., are only directions referring to the figures. Therefore, the directional terms used are used for illustration, not for limiting the invention.

Figure 1:
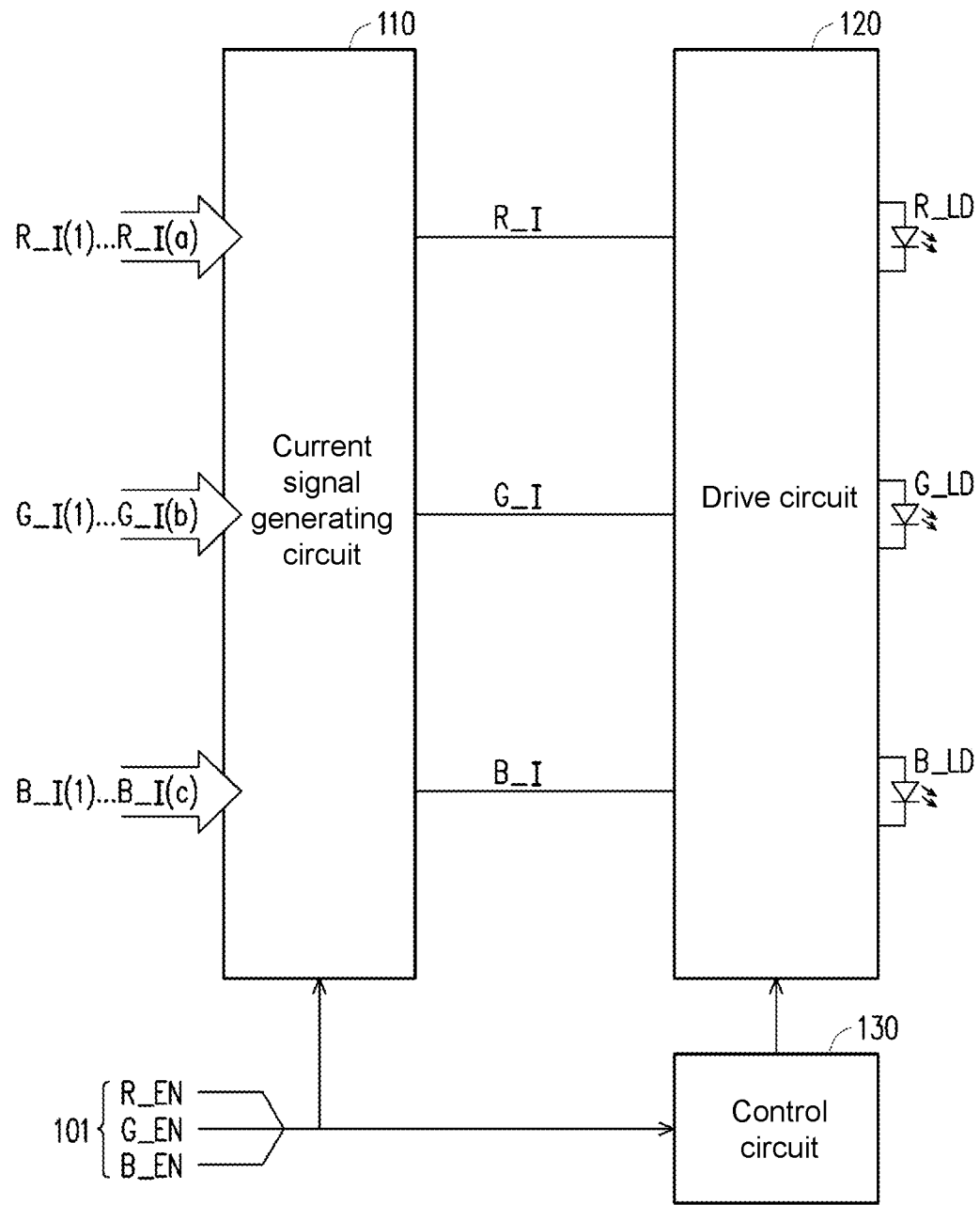
FIG. 1 shows a block diagram of a light beam generating device of an embodiment of the invention.

FIG. 1 shows a block diagram of a light beam generating device of an embodiment of the invention. Please refer to FIG. 1, a light beam generating device 100 may be disposed in a projector. The function of the light beam generating device 100 is to receive a color control signal 101 and generate a target light beam having a target color. The light beam generating device 100 includes a current signal generating circuit 110, a drive circuit 120, and a control circuit 130.

The current signal generating circuit 110 is coupled to the drive circuit 120 and configured to generate a plurality of current signals according to the color control signal 101 corresponding to the target color. Specifically, the current signal generating circuit 110 may receive current signals R_I(1) to R_I(a) and select one of the current signals R_I(1) to R_I(a) as a first current signal R_I according to the color control signal 101. Similarly, the current signal generating circuit 110 may receive current signals G_I(1) to G_I(b) and select one of the current signals G_I(1) to G_I(b) as a second current signal G_I according to the color control signal 101. The current signal generating circuit 110 may receive current signals B_I(1) to B_I(c) and select one of the current signals B_I(1) to B_I(c) as a third current signal B_I according to the color control signal 101. In particular, a, b, and c are positive integers greater than 1.

The drive circuit 120 is coupled to the current signal generating circuit 110 to receive the first current signal R_I, the second current signal G_I, and the third current signal B_I. The drive circuit 120 may include a plurality of drivers (not shown) respectively coupled to a plurality of light-emitting elements. The plurality of drivers may respectively drive the plurality of light-emitting elements according to the first current signal R_I, the second current signal G_I, and the third current signal B_I. Specifically, the drivers may drive different brightness levels or the length of time of light emission in a period according to the duty cycle value of the current signal. For example, when the drivers receive a current signal having a large duty cycle value, the drivers drive the light-emitting elements with a larger current or drive the light-emitting elements to emit light with a longer light-emitting time in a period. The plurality of light-emitting elements are driven to collectively generate a target light beam. In the present embodiment, the number of the plurality of drivers included in the drive circuit 120 is three. In addition, the number of the plurality of light-emitting elements is also three, respectively a first light-emitting element R_LD, a second light-emitting element G_LD, and a third light-emitting element B_LD. The first light-emitting element R_LD is driven to emit red light. The second light-emitting element G_LD is driven to emit a target light beam to generate a target color, and the target color is, for example, green light. The third light emitting element B_LD is driven to emit blue light. The light-emitting intensity of each light-emitting element is positively correlated with the current value of the corresponding current signal. Each light-emitting element may be a laser diode (LD) or a general light-emitting diode (LED).

The control circuit 130 is coupled to the drive circuit 120. The control circuit 130 receives the color control signal 101 and controls whether the plurality of drivers in the drive circuit 120 are enabled according to the color control signal 101. The color control signal 101 is provided to the current signal generating circuit 110. In the present embodiment, the color control signal 101 may be represented as three bits, respectively a first bit R_EN, a second bit G_EN, and a third bit B_EN. The current signal generating circuit 110 may output the first current signal R_I, the second current signal G_I, and the third current signal B_I according to the color control signal 101. Moreover, each driver in the drive circuit 120 may be enabled or disabled according to the color control signal 101.

As shown in FIG. 1, the light beam generating device of the invention 100 adopts a plurality of light sources. The light beam generating device 100 may generate a plurality of current signals according to the color control signal 101 to respectively drive a plurality of light-emitting elements to collectively generate a target light beam. It should be mentioned that the light beam generating device 100 may also determine whether each driver is enabled or disabled according to the color control signal 101. That is to say, in addition to controlling the amount of the drive current of the light-emitting elements via the color control signal 101, the color control signal 101 may also be used to determine which driver(s) to enable. Thereby, the light beam generating device 100 may generate the target light beam by using a single light source or mixing a plurality of light sources. In an embodiment, the first light-emitting element R_LD and the third light-emitting element B_LD may be driven at the same time to collectively generate red light. In an embodiment, the first light-emitting element R_LD and the second light-emitting element G_LD may be driven at the same time to collectively generate red light. Therefore, compared to using a single light source to generate a color screen, in the invention, light may be mixed by two or even three light sources, so that the placement of a color gamut may be adjusted better.

In the present embodiment, each bit of the color control signal 101 is level 0 or level 1. The three bits of the color control signal 101 may be 000, 001, 010, 011, 100, 101, 110, or 111 (corresponding to 8 states). "1" means at a high logic level, and "0" means at a low logic level. For example, the color control signal 101 is configured as "100" to indicate red light timing, "010" to indicate green light timing, and "001" to indicate blue light timing. The current signal generating circuit 110 may receive a plurality of groups of current signals, and select and output a corresponding current signal from each group of current signals according to the bit value of the color control signal 101. Each current signal in each group of current signals may be a pulse width modulation (PWM) signal. The color control signal 101 may be used as a basis for the current signal generating circuit 110 to select which PWM signal to output (determining the light-emitting intensity of the light-emitting elements). In addition, each current signal in each group of current signals may also be a direct current signal.

Figure 2:
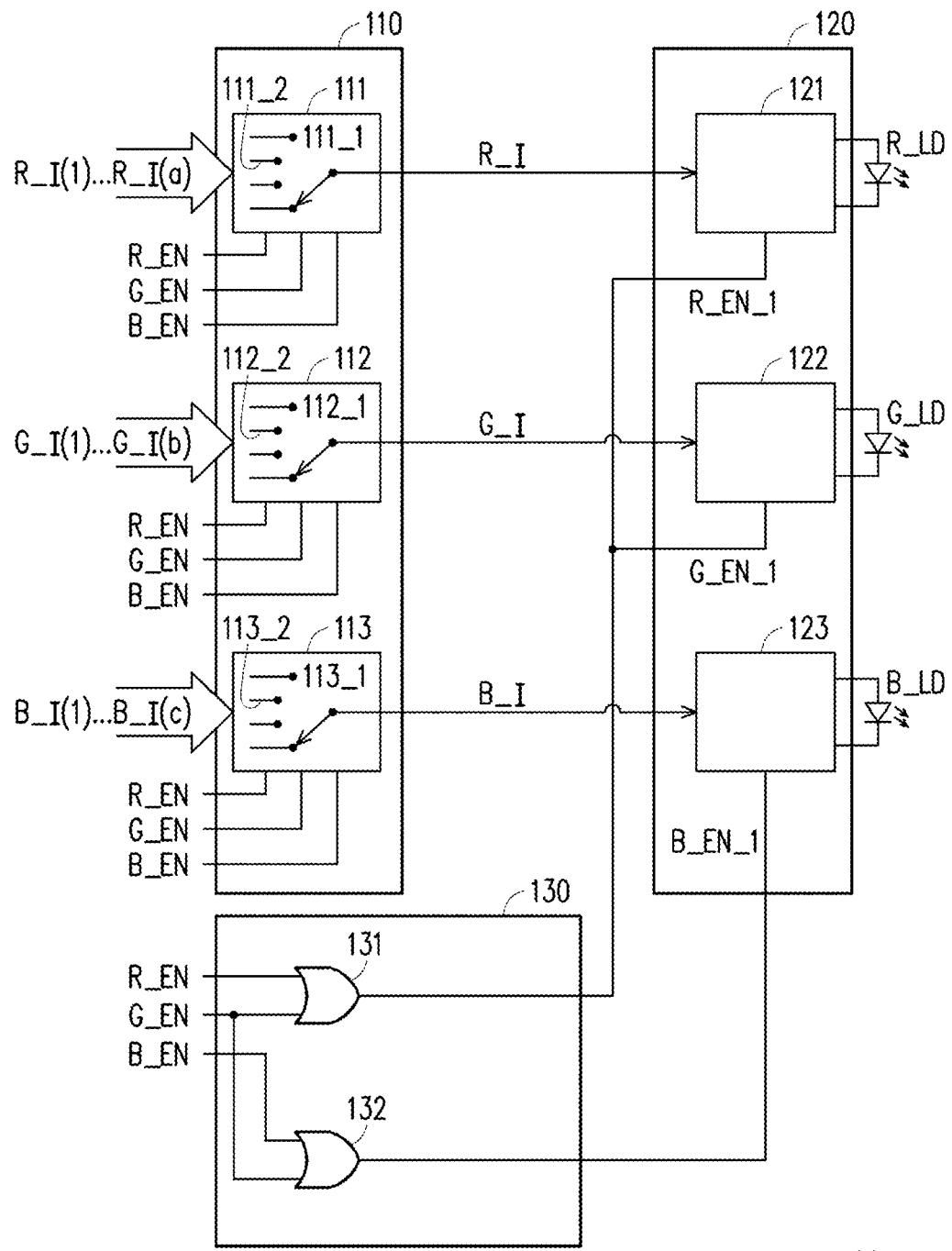
FIG. 2 shows a block diagram of a light beam generating device of another embodiment of the invention.

FIG. 2 shows a block diagram of a light beam generating device of another embodiment of the invention. Please refer to FIG. 2, the current signal generating circuit 110 may include three selection circuits 111 to 113 to be respectively coupled to three drivers 121 to 123 in the drive circuit 120. The selection circuit 111 has a plurality of input terminals and one output terminal inside. A plurality of input terminals of the selection circuit 111 respectively receive the current signals R_I(1) to R_I(a) (the number of input terminals is consistent with the value of a). The duty cycle values represented by the current signals R_I(1) to R_I(a) are different from each other. The selection circuit 111 may select one of the output current signals R_I(1) to R_I(a) according to the color control signal 101. The architecture and operation mode of the selection circuits 111 and 113 are similar to those of the selection circuit 111, and are therefore not repeated herein. The selection circuits 111 to 113 may be data selectors or multiplexers (MUX).

In the present embodiment, the circuit structures inside the selection circuits 111 to 113 may be the same. Specifically, the selection circuits 111 to 113 are all multiplexer circuit architectures of three control signals, and the selection circuits 111 to 113 may select one of the current signals R_I(1) to R_I(a), G_I(1) to G_I(b), and B 41) to B_I(c) respectively received by a plurality of input terminals for output, wherein the current signals R_I(1) to R_I(a), G_I(1) to G_I(b), and B_I(1) to B_I(c) received by each of the input terminals of each of the selection circuits 111 to 113 may correspond to different duty cycle values.

For example, referring to FIG. 2, the selection circuits 111 to 113 receive the first bit R_EN, the second bit G_EN, and the third bit B_EN in the same configuration, and when the color control signal 101 is in the same state, for example, when the color control signal 101 is "000", the selection circuits 111 to 113 all select and output the current signal of the first input terminal. In other words, the selection circuit 111 outputs the current signal R_I(1) by coupling the output terminal to an input terminal 111_1. The selection circuit 112 outputs the current signal G_I(1) by coupling the output terminal to an input terminal 112_1. The selection circuit 111 outputs the current signal B 41) by coupling the output terminal to an input terminal 113_1. The duty cycle values represented by the current signals R_I(1), G_I(1), and B_I (1) may be different from each other. When the color control signal 101 is "001", the selection circuits 111 to 113 may all select and output the PWM signals of second input terminals 111_2, 112_2, and 113_2. When the color control signal 101 is "010", the selection circuits 111 to 113 may all select and output the PWM signals of third input terminals (not shown). The case where the color control signal 101 is "010", "011" . . . "111" may be analogized.

In another embodiment, the duty cycle values of the PWM signals received by the input terminals at the same positions of the selection circuits 111 to 113 may be the same, and the selection circuits 111 to 113 receive the first bit R_EN, the second bit G_EN, and the third bit B_EN with different configurations. For example, the duty cycle values of the PWM signals received by the first input terminals of the selection circuits 111 to 113 are all 0%. However, under the same color control signal 101, the output terminals of the selection circuits 111 to 113 may be connected to input terminals at different positions via the circuit designs thereof to output current signals with different duty cycle values. The duty cycle values represented by the plurality of current signals R_I(1) to R_I(a), G_I(1) to G_I(b), and B 41) to B_I(c) received by each of the selection circuits 111 to 113 in the 8 states of the color control signal 101 may be designed. That is, when the color control signal 101 is in the same state, different input terminals are outputted.

In the present embodiment, the color control signals corresponding to the three primary colors, the first current signal R_I, the second current signal G_I, and the third current signal B_I may be as shown in the following Table (1). The values shown in Table (1) are for reference only, and designers may design according to actual requirements, so the values should not be a limitation of the invention. For example, the color control signal 101 being "010" may be designed as green light timing, and the first current signal R_I, the second current signal G_I, and the third current signal B_I may be current signals corresponding to duty cycle values of 30%, 90%, and 20%, respectively. In other words, the second light-emitting element G_LD has the largest light-emitting intensity, and the light-emitting intensities of the first light-emitting element R_LD and the third light-emitting element B_LD are much smaller in comparison. Via the light-emitting assistance of the first light-emitting element R_LD and the third light-emitting element B_LD, color gamut placement may be better controlled.

TABLE 1

| Color control Signal | Duty cycle value corresponding to current signal (%) | | |
|---|---|---|---|
| | R_I | G_I | B_I |
| Red light | 100 | 90 | 20 | 0 |
| Green light | 010 | 30 | 90 | 20 |
| Blue light | 001 | 0 | 0 | 100 |

It should be noted that due to the limitation of the drawing space, FIG. 2 only shows that each of the selection circuits 111 to 113 includes four input terminals to illustrate the "plurality of" input terminals of each of the selection circuits 111 to 113. However, this does not mean that each of the selection circuits 111 to 113 may only have four input terminals. In fact, the number of input terminals of the selection circuits 111 to 113 may be other values, for example, 8. In addition, the number of input terminals of the selection circuits 111 to 113 may be the same as each other, or may be different.

The drive circuit 120 includes the three drivers 121 to 123. The driver 121 is coupled to the selection circuit 111 to receive the first current signal R_I, thereby driving the first light-emitting element R_LD. The driver 122 is coupled to the selection circuit 112 to receive the second current signal G_I, thereby driving the second light-emitting element G_LD. The driver 123 is coupled to the selection circuit 113 to receive the third current signal B_I, thereby driving the third light-emitting element B_LD. For example, but not limited to, the control circuit 130 includes two OR gates 131 and 132. The OR gate 131 receives the first bit R_EN and the second bit G_EN of the color control signal 101 to perform an OR operation, and generates control signals R_EN_1 and G_EN_1, thereby controlling whether the drivers 121 and 122 are enabled. The OR gate 132 receives the second bit GEN and the third bit B_EN of the color control signal 101 to perform an OR operation, and generates a control signal B_EN_1, thereby controlling whether the driver 123 is enabled.

For example, the color control signal 101 indicates red light timing with "100". At this time, the first bit R_EN of the color control signal 101 is at a high voltage level, and the second bit GEN and the third bit B_EN are both at a low voltage level. The OR gate 131 receives the "1" of the first bit R_EN and the "0" of the second bit GEN for calculation and outputs "1", and therefore the drivers 121 and 122 are enabled. The OR gate 132 receives the "0" of the second bit G_EN and the "0" of the third bit B_EN for calculation and outputs "0", and therefore the driver 123 is disabled.

The color control signal 101 indicates green light timing with "010". At this time, the first bit R_EN and the third bit B_EN of the color control signal 101 are both at a low voltage level, and the second bit GEN is at a high voltage level. The OR gate 131 receives the "0" of the first bit REN and the "1" of the second bit GEN for calculation and outputs "1", and therefore the drivers 121 and 122 are enabled. The OR gate 132 receives the "1" of the second bit GEN and the "0" of the third bit B_EN for calculation and outputs "1", and therefore the driver 123 is enabled. In other words, during green light timing, the drivers 121 to 123 are all enabled.

The color control signal 101 indicates blue light timing with "001". At this time, the first bit R_EN and the second bit G_EN of the color control signal 101 are both at a low voltage level, and the third bit B_EN is at a high voltage level. The OR gate 131 receives the "0" of the first bit R_EN and the "0" of the second bit G_EN for calculation and outputs "1", and therefore the drivers 121 and 122 are disabled. The OR gate 132 receives the "0" of the second bit G_EN and the "1" of the third bit B_EN for calculation and outputs "1", and therefore the driver 123 is enabled. In other words, during blue light timing, only the driver 123 is enabled. It should be noted that, in order to pursue maximum brightness under blue light timing, in the present embodiment, a single light source (only the driver 123 is enabled) is used to generate blue light. In addition, in blue light timing, the amount of the drive current provided to the first light-emitting element R_LD and the second light-emitting element G_LD is 0 (via the selection action of the current signal generating circuit 110) to ensure that blue light is generated via a single light source (i.e., the third light-emitting element B_LD). In other embodiments, blue light may also be generated in a light mixing manner.

In another embodiment, the color control signal 101 may be four timings, wherein the fourth timing corresponds to compensated color light. In other words, a color image (red screen, blue screen, green screen, and compensation screen) is formed via four sub-screens. The color intensity of the first three sub-screens may be reduced and compensated by the fourth sub-screen. For example, the four bits of the color control signal 101 may respectively correspond to red light, green light, blue light, and warm color light, and are denoted as RGBM. In other embodiments, the four timings of the color control signal 101 may correspond to red light, green light, blue light, and yellow light, respectively, and are denoted as RGBY. Or, the four timings of the color control signal 101 may correspond to red light, green light, blue light, and white light, respectively, and are denoted as RGBW. Warm light, yellow light, or white light may be obtained by mixing the light beams of the first light-emitting element R_LD, the second light-emitting element G_LD, and the third light-emitting element B_LD.

Figure 3:
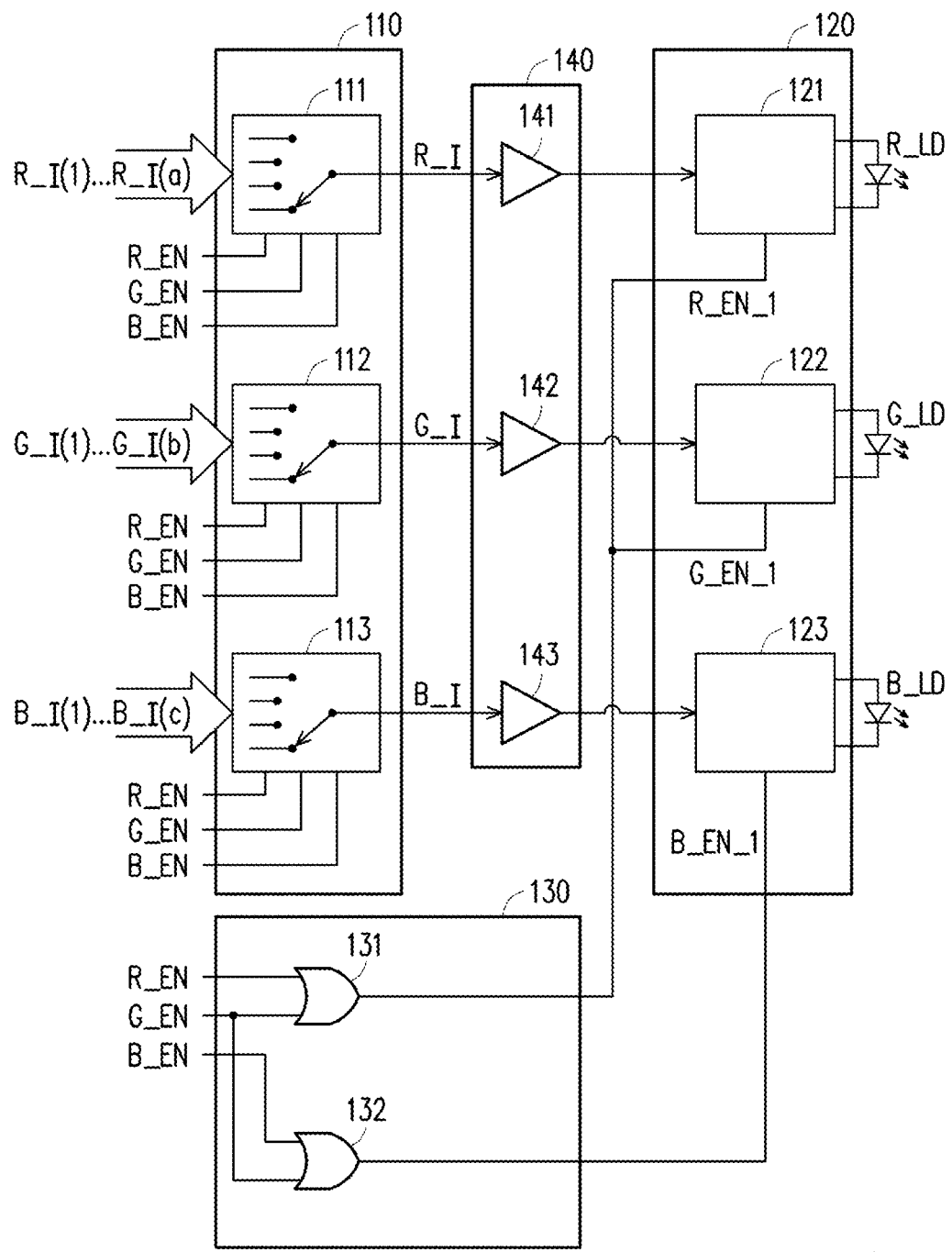
FIG. 3 shows a block diagram of a light beam generating device of another embodiment of the invention.

FIG. 3 shows a block diagram of a light beam generating device of another embodiment of the invention. Please refer to FIG. 3. The difference between the embodiments of FIG. 3 and FIG. 2 is only that a current amplifying circuit 140 is added in FIG. 3. The current amplifying circuit 140 is coupled between the current signal generating circuit 110 and the drive circuit 120. The current amplifying circuit 140 has amplifiers 141 to 143 that respectively receive current signals outputted by the selection circuits 111 to 113. The amplifiers 141 to 143 are configured to amplify the current signals outputted by the selection circuits 111 to 113, and output the amplified current signals to the drivers 121 to 123, respectively.

Figure 4:
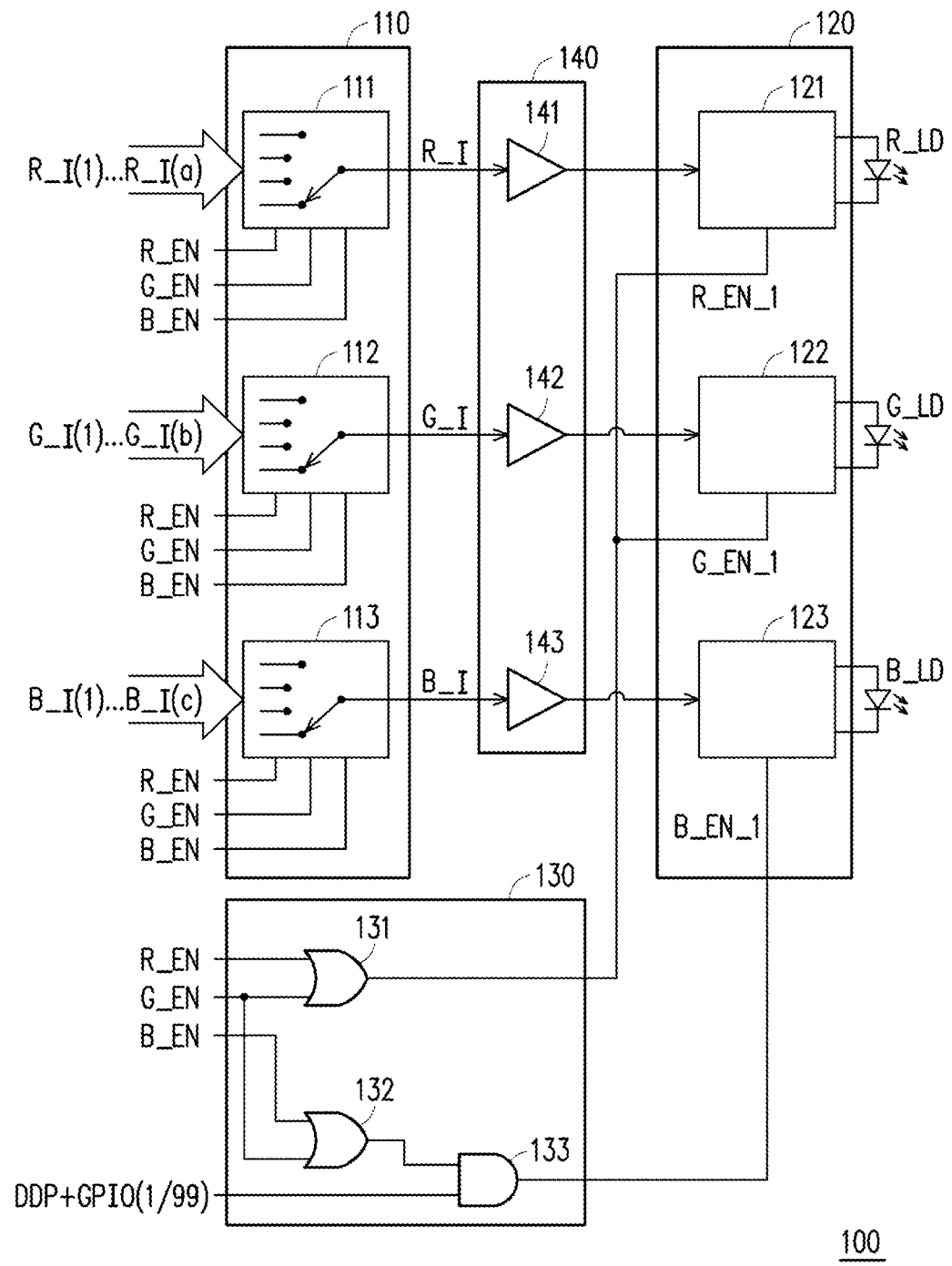
FIG. 4 shows a block diagram of a light beam generating device of another embodiment of the invention.

FIG. 4 shows a block diagram of a light beam generating device of another embodiment of the invention. Please refer to FIG. 4. The difference between the embodiments of FIG. 4 and FIG. 3 is that an AND gate 133 is added to the control circuit 130 of FIG. 4. The AND gate 133 receives the output signal of the OR gate 132 and a general-purpose input/output signal DDP_GPIO (1/99). The general-purpose input/output signal DDP_GPIO (1/99) is a flexible software-controlled digital signal. The configuration object of the AND gate 133 is explained as follows.

In the prior art, the projector may modulate light by controlling a light valve. The light valve is a digital micromirror device (DMD) having a plurality of micro reflective mirrors. When the light valve is in the ON state, the light valve guides the light beam to one direction by adjusting the DMD. In this way, the light beam is guided into the projection mirror and the light beam is projected by the projector. When the light valve is operated in the OFF state, the light valve adjusts the DMD to guide the light beam to other directions different from the direction in the ON state. Therefore, the light beam is not guided into the projection lens, and the projector is stopped from projecting the light beam.

However, the DMD needs to swing or swing to the OFF state when the light valve is closed, and the issue of light scurry may occur. To avoid this issue, the light source may be turned off via the AND gate 133 during this time interval. In the present embodiment, the input and output signal DDP_GPIO(1/99) may be at a low voltage level within 1% of the period to disable the driver 123 (because the blue light timing is arranged after the red light timing and the green light timing). However, this should not be a limitation of the invention. In another embodiment, the drivers 121 to 123 may also all be disabled via circuit design, as illustrated in FIG. 5.

Figure 5:
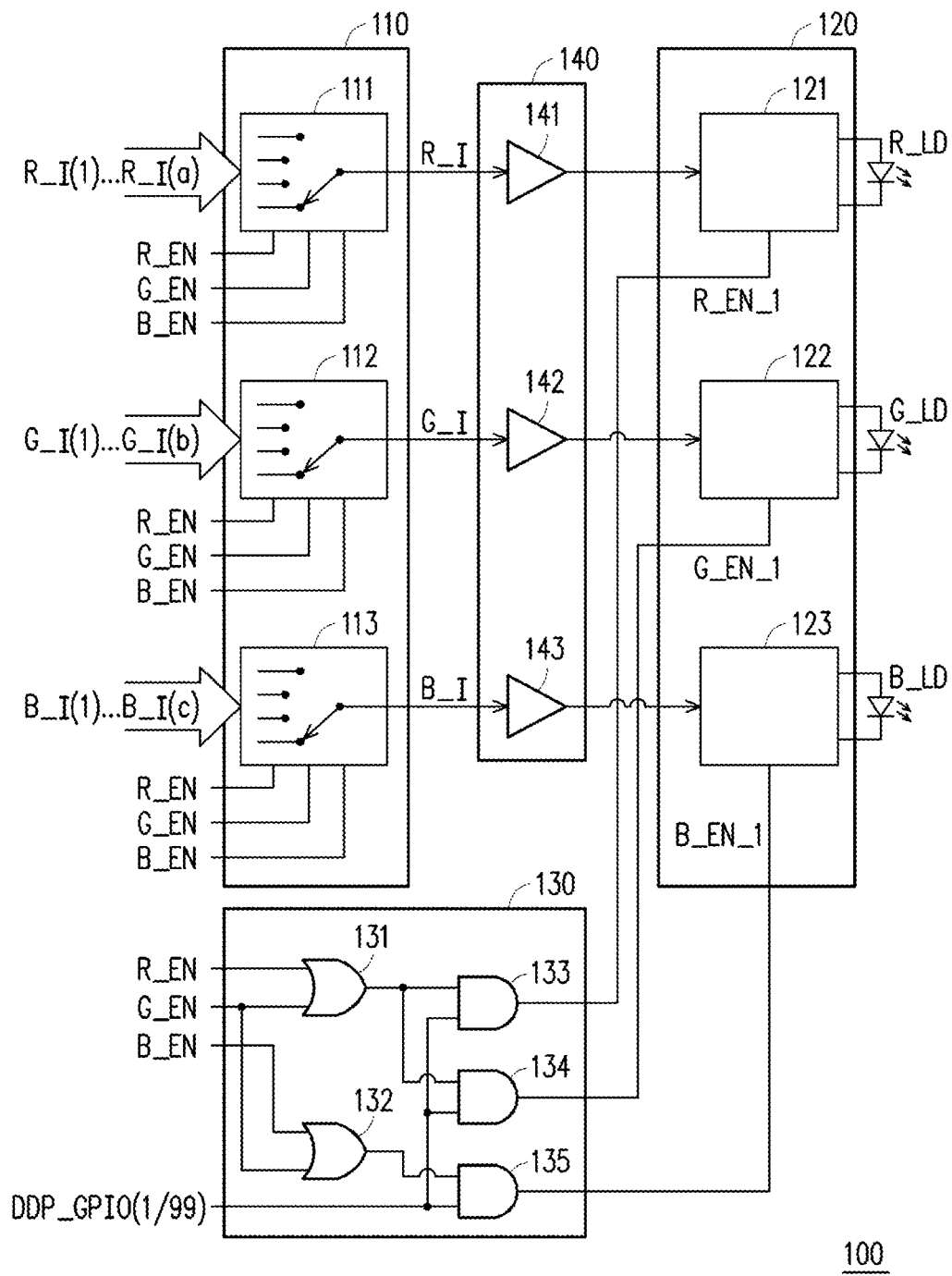
FIG. 5 shows a block diagram of a light beam generating device of another embodiment of the invention.

FIG. 5 shows a block diagram of a light beam generating device of another embodiment of the invention. Please refer to FIG. 5. The difference between the embodiments of FIG. 5 and FIG. 3 is only that AND gates 133 to 135 are added to the control circuit 130 of FIG. 5. The AND gate 133 receives the output signal of the OR gate 131 and the general-purpose input/output signal DDP_GPIO (1/99), and generates an output signal to the driver 121. The AND gate 134 receives the output signal of the OR gate 131 and the general-purpose input/output signal DDP_GPIO (1/99), and generates an output signal to the driver 122. The AND gate 135 receives the output signal of the OR gate 132 and the general-purpose input/output signal DDP_GPIO (1/99), and generates an output signal to the driver 123. Therefore, when the general-purpose input/output signal DDP_GPIO (1/99) is at a low voltage level, the drivers 121 to 123 are all disabled to ensure that no light source is generated.

Figure 6:
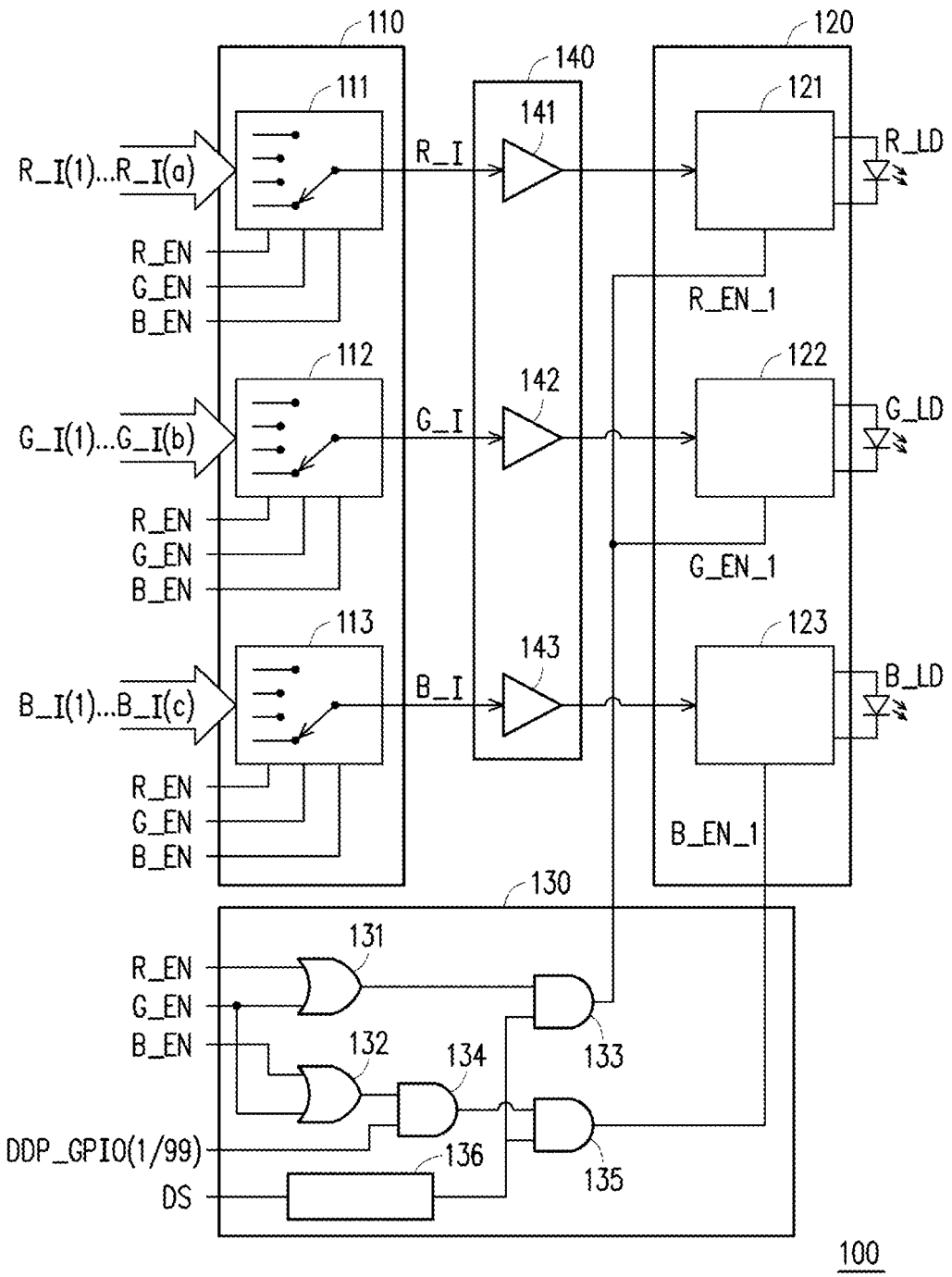
FIG. 6 shows a block diagram of a light beam generating device of another embodiment of the invention.

FIG. 6 shows a block diagram of a light beam generating device of another embodiment of the invention. Please refer to FIG. 6. The difference between the embodiments of FIG. 6 and FIG. 3 is only that the AND gates 133 to 135 and a protection circuit 136 are added to the control circuit 130 of FIG. 6. The AND gate 133 receives the output signal of the OR gate 131 and the output signal of the protection circuit 136, and generates an output signal to the driver 121. The protection circuit 136 is configured to receive a signal DS, and the signal DS indicates the rotating speed of a diffuser wheel. The use of the diffuser wheel may make the display screen more uniform. When the signal DS indicates that the rotating speed of the diffuser wheel is 0, the output signal of the protection circuit 136 is at a low voltage level to disable the drivers 121 to 123 to ensure that no light source is generated. In this way, it is possible to avoid the issue that the diffuser wheel is burned out when the light source is continuously generated but the diffuser wheel does not rotate. Those skilled in the art may understand that the light beam generating device 100 may be designed to receive any other protection indication signal to disable the drivers 121 to 123 with consideration for the rainbow effect and noise issue. The protection indication signal may be related to but not limited to protecting other optical elements such as a color wheel.

Figure 7:
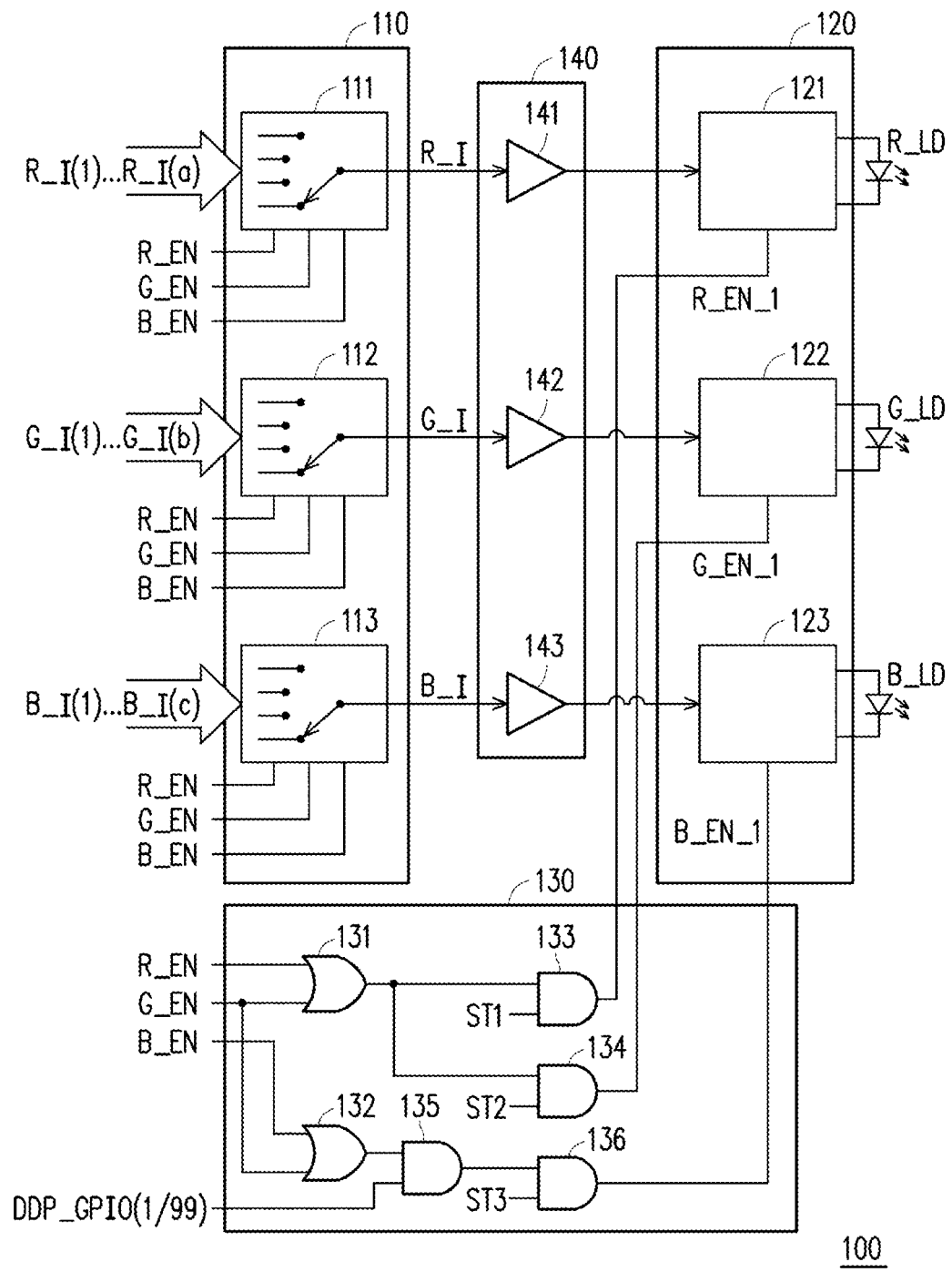
FIG. 7 shows a block diagram of a light beam generating device of another embodiment of the invention.

FIG. 7 shows a block diagram of a light beam generating device of another embodiment of the invention. Please refer to FIG. 7. The difference between the embodiments of FIG. 7 and FIG. 3 is only that AND gates 133 to 136 are added to the control circuit 130 of FIG. 7. The AND gate 133 receives the output signal of the OR gate 131 and a verification signal ST1, and generates an output signal to the driver 121. The AND gate 134 receives the output signal of the OR gate 131 and a verification signal ST2, and generates an output signal to the driver 122. The AND gate 135 receives the output signal of the OR gate 132 and the general-purpose input/output signal DDP_GPIO (1/99), and generates an output signal to the AND gate 136. The AND gate 136 receives the output signal of the AND gate 135 and a verification signal ST3, and generates an output signal to the driver 123. The production stage of the projector needs to be individually verified for the light sources (R/GB). Via this mechanism, the light sources may be individually verified during the production stage of the projector.

It should be noted that the embodiments of FIG. 3 to FIG. 7 may be modified according to actual needs of users. For example, if the input/output signal DDP_GPIO (1/99) is not needed, the embodiment shown in FIG. 7 may omit the AND gate 135, so that the output signal of the OR gate 132 may be used as an input signal of the AND gate 136. Alternatively, the AND gates 135 and 136 in FIG. 7 may be integrated into one AND gate. The AND gate has three input terminals to respectively receive the output signal of the OR gate 132, the input/output signal DDP_GPIO (1/99), and the verification signal ST3.

Figure 8:
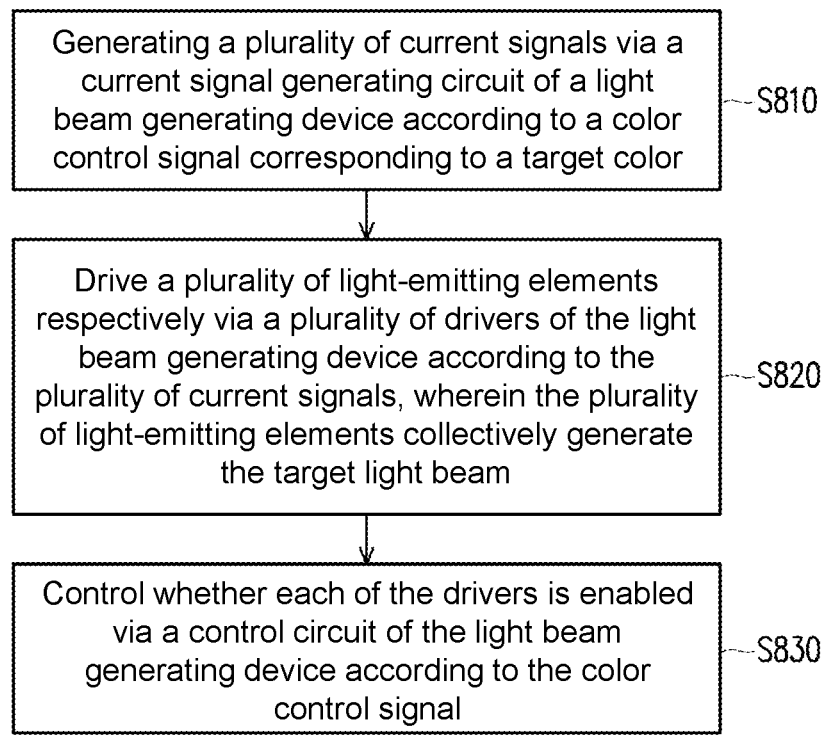
FIG. 8 shows a flow chart of the steps of a light beam generating method of another embodiment of the invention.

FIG. 8 shows a flow chart of the steps of a light beam generating method of another embodiment of the invention. The light beam generating method is configured for a light beam generating device and configured to receive a color control signal and generate a target light beam having a target color. Referring to FIG. 1 and FIG. 8 at the same time, the steps of the light beam generating method include: generating a plurality of current signals via the current signal generating circuit 110 of the light beam generating device 100 according to the color control signal 101 corresponding to a target color (step S810); driving a plurality of light-emitting elements respectively via a plurality of drivers of the drive circuit 120 of the light beam generating device 100 according to the plurality of current signals, wherein the plurality of light-emitting elements collectively generate a target light beam, so that the plurality of light-emitting elements collectively generate the target light beam (step S820); and controlling whether each of the drivers is enabled via the control circuit 130 of the light beam generating device 100 according to the color control signal 101 (step S830).

Based on the above, different from the prior art that uses a single laser light source with a phosphor wheel and a filter wheel (color wheel) to generate three primary color light sources, the light beam generating device of the invention directly adopts three primary color light sources. Therefore, the light beam generating device of the invention does not need a phosphor wheel or a filter wheel, thus fundamentally solving the issue of low fluorescence conversion efficiency. At the same time, the issue of rainbow effect and the issue of noise during the operation of the phosphor wheel and the filter wheel may also be avoided.

Furthermore, the light beam generating device of the invention may also determine the amount of the drive current of the light-emitting elements and whether each of the drivers is enabled according to the color control signal. Thereby, the light beam generating device may generate the target light beam by using a single light source or mixing a plurality of light sources, so that the placement of a color gamut may be better adjusted.

The above are only preferred embodiments of the invention, and may not be used to limit the scope of implementation of the invention. That is to say, all simple equivalent changes and modifications made in accordance with the claims of the invention and the content of the specification are still within the scope of the patent of the invention. In addition, the solution of any embodiment or claim of the invention does not need to achieve all the objects or advantages or features disclosed in the invention. In addition, the abstract and the title of the invention are only used to assist the search of patent documents, not to limit the scope of the invention. In addition, terms such as "first" and "second" mentioned in the present specification or claims are only used to name the element or to distinguish different embodiments or ranges, and are not used to limit the upper or lower limit of the number of elements.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light beam generating device, wherein the light beam generating device is configured to receive a color control signal and generate a target light beam having a target color, and the light beam generating device comprises a plurality of drivers, a current signal generating circuit, and a control circuit, wherein:
    the plurality of drivers respectively drive a plurality of light-emitting elements according to a plurality of current signals, wherein the plurality of light-emitting elements collectively generate the target light beam, wherein the plurality of drivers comprise a first driver, a second driver, and a third driver, and the color control a comprise three bits, respectively a first bit, a second bit, and a third bit to respectively correspond to three colored lights of different wavelengths;
    the current signal generating circuit is coupled to the plurality of drivers and configured to generate the plurality of current signals according to the color control signal corresponding to the target color; and
    the control circuit is coupled to the plurality of drivers and configured to control whether each of the drivers is enabled according to the color control signal, wherein the control circuit comprises:
        a first OR gate configured to perform an OR operation on the first bit and the second bit, wherein an output signal of the first OR gate controls whether the first driver and the second driver are enabled; and
        a second OR gate configured to perform an OR operation on the second bit and the third bit, wherein an output signal of the second OR gate controls whether the third driver is enabled.

2. The light beam generating device of claim 1, wherein the current signal generating circuit comprises a plurality of selection circuits respectively coupled to the plurality of drivers, and each of the selection circuits is configured to select a current signal from the plurality of current signals to be provided to a corresponding driver according to the color control signal.

3. The light beam generating device of claim 1, wherein the current signal generating circuit comprises:
    a first selection circuit coupled to the first driver and configured to select a current signal from the plurality of current signals as a first current signal according to the color control signal;
    a second selection circuit coupled to the second driver and configured to select a current signal from the plurality of current signals as a second current signal according to the color control signal;
    a third selection circuit coupled to the third driver and configured to select a current signal from the plurality of current signals as a third current signal according to the color control signal,
    wherein the first driver, the second driver, and the third driver drive corresponding light-emitting elements according to the first current signal, the second current signal, and the third current signal, respectively.

4. The light beam generating device of claim 1, wherein the light beam generating device further comprises:
    a current amplifying circuit coupled between the current signal generating circuit and the plurality of drivers and configured to amplify the plurality of current signals to be provided to the plurality of drivers.

5. The light beam generating device of claim 1, wherein whether at least one of the plurality of drivers is enabled is also controlled by an off signal, and the off signal indicates a time interval during which a digital micromirror device is turned off.

6. The light beam generating device of claim 1, wherein whether the plurality of drivers are enabled is also controlled by a protection signal, and the protection signal is related to a rotating speed value of a diffusion wheel.

7. The light beam generating device of claim 1, wherein whether each of the drivers is enabled is also controlled by a verification signal, so that an enable time of each of the drivers is staggered.

8. A projection device comprising the light beam generating device of claim 1.

9. A light beam generating method configured for a light beam generating device, wherein the light beam generating method is configured to receive a color control signal and generate a target light beam having a target color, comprising:
    generating a plurality of current signals via a current signal generating circuit of the light beam generating device according to the color control signal corresponding to the target color;
    driving a plurality of light-emitting elements respectively via a plurality of drivers of the light beam generating device according to the plurality of current signals, wherein the plurality of light-emitting elements collectively generate the target light beam and wherein a number of the plurality of drivers is three;
    controlling whether each of the drivers is enabled via a control circuit of the light beam generating device according to the color control signal, wherein the color control signal comprises at least three bits, three of the at least three bits respectively instruct the plurality of drivers to generate a red light beam, a green light beam, and a blue light beam to form the target color;
    enabling two of the drivers via the control circuit when a first bit of the at least three bits is at a first logic level and a second bit of the at least three bits and a third bit of the at least three bits are both at a second logic level, wherein the target light is a red light;
    enabling all of the drivers via the control circuit when the second bit is at the first logic level and the first bit and the third bit are both at the second logic level, wherein the target color is a green light; and
    enabling only one of the drivers via the control circuit when the third bit is at the first logic level and the first bit and the second bit are both at the second logic level, wherein the target color is a blue light.

10. The light beam generating method of claim 9, wherein the light beam generating method further comprises:

performing an OR operation on the first bit and the second bit via the control circuit to generate a first operation result, wherein whether the first driver and the second driver are enabled is controlled by the first operation result; and performing an OR operation on the second bit and the third bit via the control circuit to generate a second operation result, wherein whether the third driver is enabled is controlled by the second operation result.

11. The light beam generating method of claim 9, wherein the current signal generating circuit comprises a plurality of selection circuits to be respectively coupled to the plurality of drivers, and the light beam generating method further comprises:

selecting a current signal from the plurality of current signals via each of the selection circuits according to the color control signal to be provided to a corresponding driver.

12. The light beam generating method of claim 9, wherein the plurality of drivers comprise a first driver, a second driver, and a third driver, the current signal generating circuit comprises a first selection circuit, a second selection circuit, and a third selection circuit respectively coupled to the first driver, the second driver, and the third driver, and the light beam generating method further comprises:

selecting a current signal from the plurality of current signals as a first current signal via the first selection circuit according to the color control signal;

selecting a current signal from the plurality of current signals as a second current signal via the second selection circuit according to the color control signal;

selecting a current signal from the plurality of current signals as a third current signal via the third selection circuit according to the color control signal, wherein the first driver, the second driver, and the third driver drive corresponding light-emitting elements according to the first current signal, the second current signal, and the third current signal, respectively.

13. The light beam generating method of claim 9, wherein the light beam generating device further comprises a current amplifying circuit coupled between the current signal generating circuit and the plurality of drivers, and the light beam generating method further comprises:

amplifying the plurality of current signals via the current amplifying circuit to be provided to the plurality of drivers.

14. The light beam generating method of claim 9, wherein whether at least one of the plurality of drivers is enabled is also controlled by an off signal, and the off signal indicates a time interval during which a digital micromirror device is turned off.

15. The light beam generating method of claim 9, wherein whether the plurality of drivers are enabled is also controlled by a protection signal, and the protection signal is related to a rotating speed value of a diffusion wheel.

16. The light beam generating method of claim 9, wherein whether each of the drivers is enabled is also controlled by a verification signal, so that an enable time of each of the drivers is staggered.

* * * * *